March 22, 1927.
L. E. RABJOHN ET AL
1,621,684
WATER FILTER
Filed Aug. 24, 1925
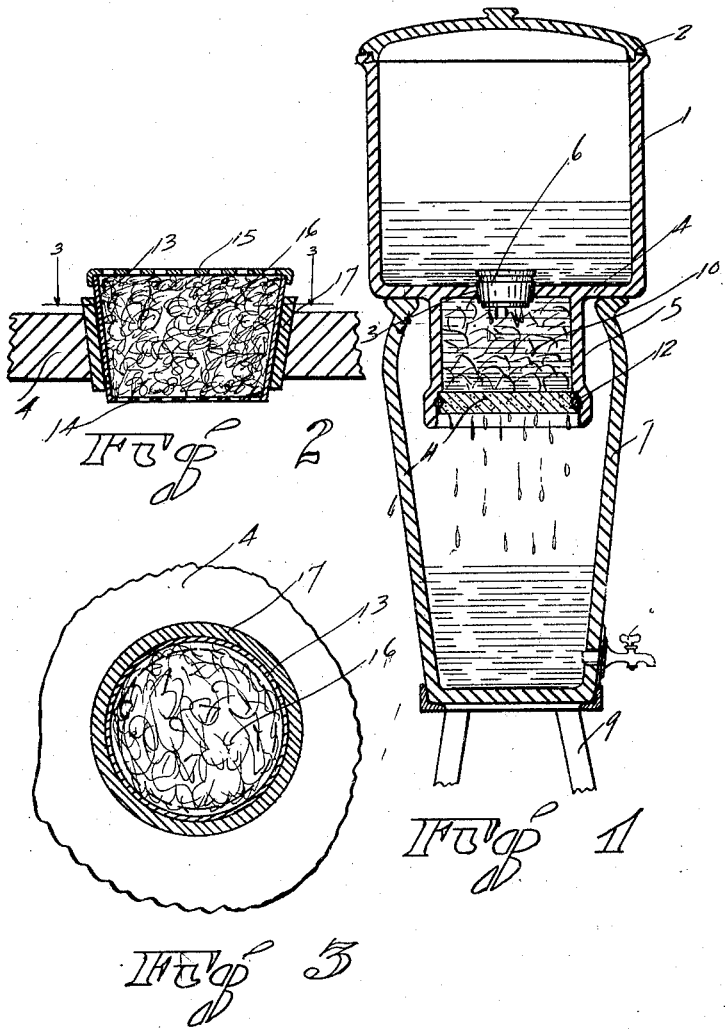
INVENTORS
L.E.RABJOHN
R.W.HOLLENBERG
BY
ATTY.

Patented Mar. 22, 1927.

1,621,684

UNITED STATES PATENT OFFICE.

LLOYD E. RABJOHN, OF BURLINGAME, AND RALPH W. HOLLENBERG, OF ALAMEDA, CALIFORNIA.

WATER FILTER.

Application filed August 24, 1925. Serial No. 51,914.

This invention relates to improvements in water filters and more particularly to that type of filters which comprise a combined storage and filtering receptacle for water which is associated with a water cooling receptacle from which the water is drawn as desired, such types being popular in offices and public places and also to some extent, in households.

One of the objects of the invention is to provide a filter of the character described which will be more thorough and effective in its filtering action than filters such as heretofore provided, there being in the present instance, a three stage filtering arrangement requiring that the water pass through three stages of filtration before it is subject to withdrawal and use from the cooling receptacle.

A further object of the invention is to provide a filter of the character described in which the filtering means as a whole, is of novel and efficacious form and arrangement providing for ready renewal of filtering elements and an easy cleaning of the various parts thereof.

Another object of the invention is to provide a filter of the character described which is simple as to construction and design, inexpensive and of a compact and durable nature.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a vertical sectional view of a water filter constructed in accordance with this invention.

Fig. 2 represents a vertical sectional view of one of the filtering elements.

Fig. 3 represents a top plan view of the filtering element shown in Fig. 2.

The present embodiment of the invention shown in detail in the accompanying drawing comprises a porcelain or other pottery tank 1 having a removable closure 2 at its upper end and provided with a central opening 3 in its bottom wall 4. Beneath this tank is a small cylindrical filter chamber 5 formed integral with the bottom wall 4 and into which water enters from a filtering element 6 mounted in the opening 3. The tank 1 is adapted to rest upon the upper end of a cooler receptacle 7 with the chamber 5 extending into said receptacle and spaced circumferentially therefrom. The cooler receptacle is provided with the usual spigot 8 and is mounted on a stand 9.

The chamber 5 is substantially filled with a suitable filtering medium 10, preferably charcoal. The cleaning and filling of the chamber is provided for by the opening 3 in which the filtering element 6 is removably mounted. The lower end of the chamber 5 is closed by a filtering element 11 preferably comprising a porous stone disk or slab cemented as at 12 to the wall of the chamber and therefore permanently secured in place. This filtering element or stone is designed to filter the water through it much more slowly than the filter 6, whereby the chamber 5 will be maintained full of water and the action of the charcoal filtering medium will therefore be more effective and thorough.

The filtering element 6 comprises a tapered receptacle 13 having its upper end open and provided with a perforated bottom wall 14. A removable perforated flanged closure 15 is mounted on the upper end of this receptacle and retains in the receptacle a suitable quantity of filtering material 16, for example, cotton or asbestos. A tapered rubber gasket 17 is fitted in the opening 3 and provides for tightly wedging the receptacle in said opening, to insure a leak-proof joint between the imperforate sides of the receptacle 13 and the wall of the opening 3.

Water filtering through the filtering material 16 is substantially freed from sediment and other foreign matter and on entering the chamber 5 through the perforated bottom 14, is again filtered through the charcoal in said chamber. The final and thorough filtering action takes place as the water slowly seeps through the porous element or stone 11 and drops into the cooling receptacle 7. Inasmuch as the seepage through the filtering stone 11 is slower than through the element 6, the chamber 5 is at all times filled with water and said water is therefore subjected to the action of the charcoal for a period of time sufficient to effectively clear and treat the water. In this way the water passes through three filtering stages and is therefore thoroughly and effectively filtered when it reaches the cooling receptacle 7.

By having the first filtering element 6 removably mounted in the opening 3, the cleansing out and refilling of the chamber 5 may be readily and easily effected. On removal of the flanged lid 15 the receptacle 13 may be readily cleaned and refilled without removing it from the opening 3.

We claim:

1. A water filter comprising a storage receptacle for water having an integral filtering chamber depending from its lower side and provided on its lower wall with an opening communicating the interior of the receptacle with the filtering chamber, a loose filtering medium contained in said filtering chamber, a filtering element removably mounted in said opening, a filtering stone closing the lower end of said chamber through which stone water filters from the chamber and a receptacle which supports said storage receptacle with the filtering chamber extending into the upper end thereof.

2. A water filter comprising a storage receptacle for water having an integral filtering chamber depending from its lower side and provided on its lower wall with an opening communicating the interior of the receptacle with the filtering chamber, a filtering medium contained in said filtering chamber, a filtering element mounted in said opening, a filtering stone at the lower end of said chamber through which water filters from the chamber and a receptacle which supports said storage receptacle with the filtering chamber extending into the upper end thereof, said filtering stone causing a slower filtering action through it than the first named filtering medium.

3. A water filter comprising a storage receptacle for water, a filtering chamber on the under side of said receptacle and which is of less diameter than said receptacle, said storage receptacle having an opening in its bottom wall communicating the receptacle with said chamber, a container for filtering material removably mounted in said opening and having perforate top and bottom walls and imperforate side walls, loose filtering material in said container, said top wall of the container being removable, filtering material in said chamber, a filtering stone extending across the lower side of said chamber and supporting said last named filtering material and a receptacle supporting said storage receptacle and into the upper end of which said filter chamber extends.

LLOYD E. RABJOHN.
RALPH W. HOLLENBERG.